United States Patent
Holland et al.

(10) Patent No.: US 12,244,807 B2
(45) Date of Patent: Mar. 4, 2025

(54) DETERMINING ADAPTIVE QUANTIZATION MATRICES USING MACHINE LEARNING FOR VIDEO CODING

(71) Applicant: Intel Corporation, Santa Clara, CA (US)

(72) Inventors: James Holland, Folsom, CA (US); Sang-hee Lee, San Jose, CA (US); Ximin Zhang, San Jose, CA (US); Zhan Lou, Shanghai (CN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 18/031,563

(22) PCT Filed: Nov. 30, 2020

(86) PCT No.: PCT/US2020/062604
§ 371 (c)(1),
(2) Date: Apr. 12, 2023

(87) PCT Pub. No.: WO2022/115113
PCT Pub. Date: Jun. 2, 2022

(65) Prior Publication Data
US 2023/0412808 A1     Dec. 21, 2023

(51) Int. Cl.
| | |
|---|---|
| *H04N 7/12* | (2006.01) |
| *G06N 20/00* | (2019.01) |
| *H04N 19/126* | (2014.01) |
| *H04N 19/149* | (2014.01) |
| *H04N 19/172* | (2014.01) |

(52) U.S. Cl.
CPC ........... *H04N 19/126* (2014.11); *G06N 20/00* (2019.01); *H04N 19/149* (2014.11); *H04N 19/172* (2014.11)

(58) Field of Classification Search
CPC .. H04N 19/126; H04N 19/149; H04N 19/172; H04N 19/176; G06N 20/00; G06N 3/08
USPC ..................................................... 375/240.03
See application file for complete search history.

(56) References Cited

U.S. PATENT DOCUMENTS

| | | | | |
|---|---|---|---|---|
| 11,172,210 B2* | 11/2021 | Andreopoulos | ..... | H04N 19/126 |
| 11,429,862 B2* | 8/2022 | Chai | ...................... | G06N 3/044 |
| 2009/0238479 A1* | 9/2009 | Jaggi | ..................... | H04N 19/149 |
| | | | | 382/246 |
| 2012/0251015 A1 | 10/2012 | Lim et al. | | |
| 2013/0251032 A1 | 9/2013 | Tanaka | | |

(Continued)

OTHER PUBLICATIONS

International Preliminary Report on Patentability from PCT/US2020/062604 notified Jun. 15, 2023, 7 pgs.

(Continued)

*Primary Examiner* — Gims S Philippe
(74) *Attorney, Agent, or Firm* — Akona IP PC

(57) ABSTRACT

Techniques related to adaptive quantization matrix selection using machine learning for video coding are discussed. Such techniques include applying a machine learning model to generate an estimated quantization parameter for a frame and selecting a set of quantization matrices for encode of the frame from a number of sets of quantization matrices based on the estimated quantization parameter.

22 Claims, 9 Drawing Sheets

(56) References Cited

U.S. PATENT DOCUMENTS

| | | | |
|---|---|---|---|
| 2013/0322528 A1* | 12/2013 | Fuchie | H04N 19/172 375/240.07 |
| 2015/0172660 A1 | 6/2015 | Wang et al. | |
| 2018/0084253 A1 | 3/2018 | Thiagarajan et al. | |
| 2019/0132591 A1 | 5/2019 | Zhang et al. | |
| 2020/0099931 A1 | 3/2020 | Tanaka | |
| 2020/0162738 A1* | 5/2020 | Kanoh | H04N 19/176 |
| 2020/0162760 A1* | 5/2020 | Wassenberg | H04N 19/176 |
| 2020/0322606 A1* | 10/2020 | Horowitz | H04N 19/463 |
| 2021/0281846 A1* | 9/2021 | Hsiang | H04N 19/167 |
| 2021/0360258 A1* | 11/2021 | Qin | H04N 19/194 |

OTHER PUBLICATIONS

Search Report from Netherlands Patent Application No. 2029548 notified Feb. 10, 2023, 12 pgs.

Flynn, David, et al., "Transform Skipping in the presence of Scaling Lists", Joint Collaborative Team on Video Coding (JCT-VC) of ITU-T SG16 WP3 and ISO/IEC JTC1/SC29/WG11, 10th Meeting: Stockholm, SE, Jul. 11-20, 2012, 6 pgs.

International Search Report and Written Opinion for PCT Patent Application No. PCT/US2020/062604, dated Aug. 20, 2021.

* cited by examiner

DETERMINING ADAPTIVE QUANTIZATION MATRICES USING MACHINE LEARNING FOR VIDEO CODING

CLAIM OF PRIORITY

This Application is a National Stage Entry of, and claims priority to, PCT Application No. PCT/US2020/062604, filed on 30 Nov. 2020 and titled "DETERMINING ADAPTIVE QUANTIZATION MATRICES USING MACHINE LEARNING FOR VIDEO CODING", which is incorporated by reference in its entirety for all purposes.

BACKGROUND

In compression/decompression (codec) systems, compression efficiency and video quality are important performance criteria. Visual quality is an important aspect of the user experience in many video applications and compression efficiency impacts the amount of memory storage needed to store video files and/or the amount of bandwidth needed to transmit and/or stream video content. For example, a video encoder compresses video information so that more information can be sent over a given bandwidth or stored in a given memory space or the like. The compressed signal or data may then be decoded via a decoder that decodes or decompresses the signal or data for display to a user. In most implementations, higher visual quality with greater compression is desirable.

In video compression standards, encoding includes block-based prediction, transform, and quantization. As a key part of rate control, using suitable quantization is one of the most important techniques to differentiate one video solution from other solutions. Quantization techniques that achieve good video quality with minimum bitrate are desirable for all video applications. Since the human visual system (HVS) is more sensitive to brightness changes in relatively large areas (low frequency) and less sensitive to high frequency variations, a quantization matrix is supported by current video coding standards. Although the advantages of quantization matrix applications have been proved for many scenarios, they may cause undesirable effects such as blurring and sudden quality changes from frame to frame. Therefore, current encoding applications typically limit the use of quantization matrices.

It may be advantageous to improve the accuracy and efficiency of quantization matrix coding for improved compression efficiency and/or video quality. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
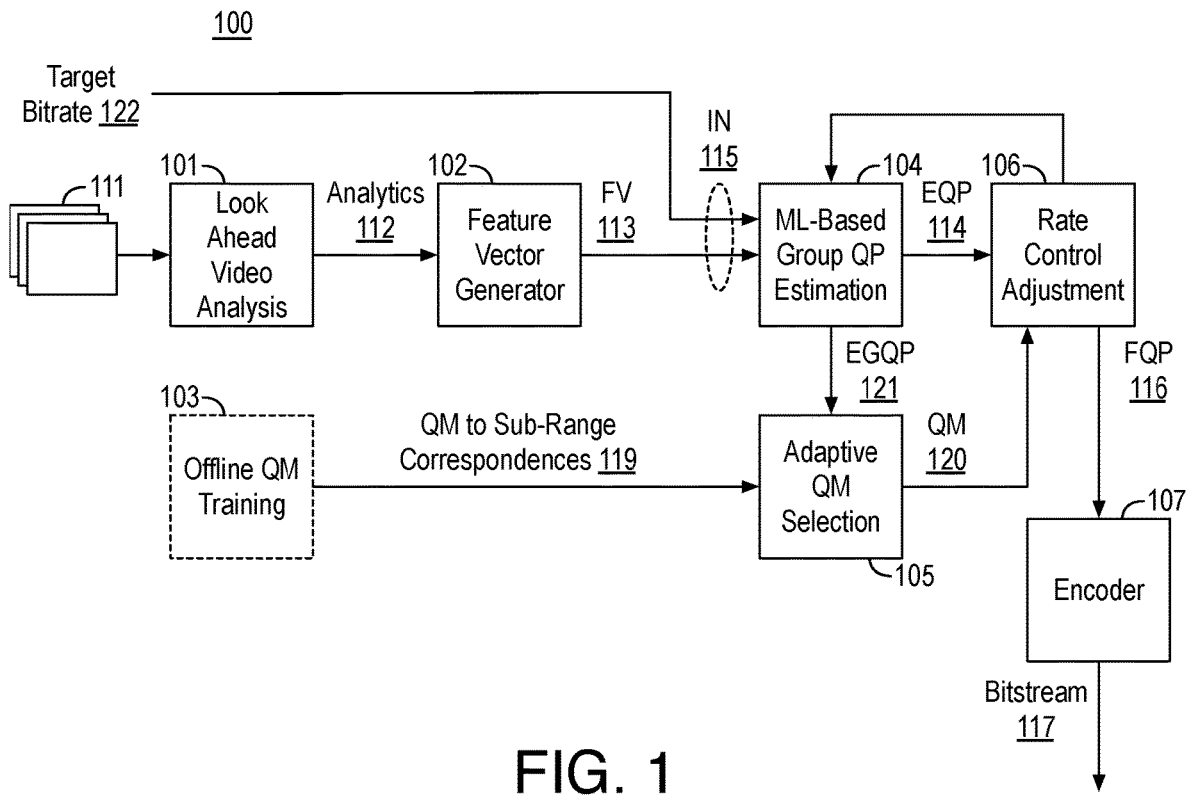
FIG. 1 is an illustrative diagram of an example system for video coding including adaptive quantization matrix selection.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to selection of adaptive quantization matrices using machine learning.

As described above, in modern video coding, the use of quantization matrices is supported by current video coding standards in response to the human visual system (HVS) being more sensitive to brightness changes in relatively large areas (low frequency) and less sensitive to high frequency variations. As used herein, the term quantization matrix indicates a matrix of values applied transformed coefficients. Typically, a matrix of transformed coefficients are divided (in an entry-wise manner) by the values of the quantization matrix, optionally after pre-multiplication by a quantization scale, prior to encode (e.g., run length encode) of the resultant quantized coefficients. In some embodiments, with a quantization matrix, the transformed coefficients are pre-multiplied by the quantization scale and divided with different values defined by the quantization matrix. For example, a quantization matrix may be designed to provide more resolution to more HVS sensitive frequency coefficient than less HVS sensitive coefficients.

The techniques discussed herein provide an adaptive quantization matrix encoding scheme using machine learning. Such techniques include offline quantization matrix (QM) training to derive a set of quantization matrices and corresponding rate control offsets through offline training. Furthermore, such techniques include machine learning based group quantization parameter (QP) estimation to estimate the QP for a group of pictures using look ahead analysis obtained statistics such that, according to the estimated QP, a quantization matrix is selected. The rate control offsets may be used to handle a quantization matrix switch between frames to avoid sudden quality change. Furthermore, an adaptive quantization matrix transition technique is provided to avoid the back and forth quality oscillations.

Using the discussed techniques, improved subjective quality is attained as compared to our existing encode solutions. For example, the quantization matrices and corresponding techniques discussed herein can avoid blurring caused by conventional matrices while simultaneously improving the quality of the important low frequency component. The discussed techniques may be employed in any encoding context and using any standard to generate a standards compliant bitstream that may be H.264/MPEG-4 Advanced Video Coding (AVC) standards compliant, H.265 High Efficiency Video Coding (HEVC) standards compliant, VP9 standards compliant, etc.

In some embodiments, during a training phase, an available QP range is divided into sub-ranges. For example, the available QP range may be defined by the coding standard being deployed and the available QP range may be divided in any manner into the sub-ranges (e.g., with each sub-range having the same number of QP values or with some sub-ranges, such as those more likely QPs, having fewer QP values). A set of initial quantization matrices are then generated for each sub-range. For example, each set may include a quantization matrix for each applicable block size (e.g., 4×4, 8×8, 16×16, etc.). The AC frequency value and DC frequency values may then be modified to generate additional quantization matrices for testing. For example, the values may be modified by +/−1 and +/−2 to generate any number of such additional quantization matrices for testing. As used herein, the AC frequency value or component of a quantization matrix (or matrix of transformed coefficient) indicates the lowest frequency value or component and is typically the top-left value or component of the matrix. The term DC frequency value or component indicates all other values and, notably, the frequency of such components increases moving away from the AC frequency value with such movement typically being to the right and/or down from the AC value. A number of test video sequences are then encoded using the available quantization matrices for testing and a final set of quantization matrices are selected based on a subjective quality of the resultant encodes after corresponding decode. Such subjective quality may be based on standardized subjective quality metrics, for example.

In a deployment phase, as discussed, each QP sub-range of the available QP range has a corresponding set of quantization matrices. An estimated QP for a current frame is then determined based on the current frame and one or more temporally subsequent frames. For example, such QP estimation may be based on applying a pretrained machine learning model to a set of features generated using the current frame and one or more temporally subsequent frames. A determination is then made as to which particular QP sub-range the estimated QP is within. In response to the particular QP sub-range, the corresponding quantization matrices are used to encode the current frame. Furthermore, in order to avoid sudden quality changes between frames, in some embodiments, a frame prior to the current frame may use the quantization matrices determined for the current frame for the prior frame when the estimated QP of the current frame is a quantization matrix switching QP. As used herein, the term quantization matrix switching QP indicates a QP on an edge of a QP sub-range that causes a switch to a new QP sub-range. Such early quantization matrix switching may avoid such sudden quality changes. In addition or in the alternative, when the estimated QP is estimated using quantization matrices other than the selected quantization matrices, the estimated QP may be adjusted to an encode QP for encode of the current frame. Such techniques are discussed further herein below.

FIG. 1 is an illustrative diagram of an example system 100 for video coding including adaptive quantization matrix selection, arranged in accordance with at least some implementations of the present disclosure. As shown in FIG. 1, system 100 includes a look ahead video analysis module 101, a feature vector generator 102, an offline quantization matrices (QM) training module 103, a machine learning based QP estimation module 104, an adaptive QM selection module 105, a rate control adjustment module 106, and an encoder 107. Furthermore, offline QM training module 103 may be implemented by system 100 or by another system with the corresponding data set, QM to sub-range correspondences 119 being implemented in memory of system 100.

As shown, system 100 receives input video 111 for coding and system 100 provides video compression to generate a bitstream 117 such that system 100 may be a video encoder implemented via a computer or computing device or the like. As discussed further herein, system 100 efficiently determines a QP and corresponding quantization matrices for encode of frames of input video 111. Bitstream 117 may be any suitable bitstream such as standards compliant bitstreams. For example, bitstream 117 may be AVC standards compliant, HEVC standards compliant, VP9 standards compliant, etc. System 100 may be implemented via any suitable device such as, for example, a personal computer, a laptop computer, a tablet, a phablet, a smart phone, a digital camera, a gaming console, a wearable device, an all-in-one device, a two-in-one device, or the like or a platform such as a mobile platform or the like. For example, as used herein, a system, device, computer, or computing device may include any such device or platform.

System 100 may include other modules or components not shown for the sake of clarity of presentation. For example, encoder 107 (and look ahead video analysis module 101) may include one or more of a partition module, a transform module, a quantization module, an intra prediction module, a motion estimation module, a motion compensation module, a scanning module, an entropy encode module, etc. Furthermore, encoder 107 may include a local decode loop including an inverse quantization module, an inverse transform module, and an adder for combining reconstructed residual blocks with reference blocks, a deblock filtering module, a sample adaptive offset (SAO) filtering module, etc. Such modules and the operations associated therewith are known to those of skill in the art and are not discussed further herein for the sake of clarity in presentation.

As discussed, system 100 receives input video 111 such as a video sequence of video frames. Input video 111 may include any suitable video frames, video pictures, sequence of video frames, group of pictures, groups of pictures, video data, or the like in any suitable resolution. For example, input video 111 may be video graphics array (VGA), high definition (HD), Full-HD (e.g., 1080p), 4K resolution video, 5K resolution video, or the like, and the video may include any number of video frames, sequences of video frames, pictures, groups of pictures, or the like. Techniques herein are discussed with respect to frames and blocks for the sake of clarity of presentation. However, such frames may be characterized as pictures, video frames or pictures, sequences of frames or pictures, video sequences, or the like, and such blocks may be characterized as coding units, coding blocks, macroblocks, sub-units, sub-blocks, or the like. For example, a picture or frame of color video data may include a luminance plane or component and two chrominance planes or components at the same or different resolutions with respect to the luminance plane. Input video 111 may include pictures or frames that may be divided into blocks of any size, which contain data corresponding to, for example, M×N blocks of pixels. Such blocks may include data from one or more planes or color channels of pixel data. As used herein, the term block may include macroblocks, coding units, or the like of any suitable sizes. As will be appreciated such blocks may also be divided into sub-blocks for prediction, transform, or the like.

Look ahead video analysis module 101 receives input video 111, which includes multiple video frames. As shown, look ahead video analysis module 101 generates analytics data 112 based on input video such that analytics data 112 includes any suitable data and data structures generated using input video 111 for use in feature vector generation and/or target frame size decisions. Look ahead video analysis module 101 may apply look ahead analysis using any number of frames. For example, look ahead analysis may be applied to N frames where N is one for extreme low latency coding applications and can be up to 60 for applications that can tolerate high delay. In some embodiments, analytics data 112 is used to generate a target bitrate 122 such that target bitrate 122 may include a target frame size for each frame of input video 111. However, target bitrate 122 may be generated using any suitable technique or techniques. In some embodiments, analytics data 112 includes actual encode generated data or information such as encoded data generated based on a constant QP encoded of downsampled input video 111. As discussed further herein, based on a change from the current quantization matrix set used to estimate the QP and a quantization matrix set selected for the current frame, rate control adjustment module 106 may adjust the QP used to code the current frame. In addition or in the alternative, based on quantization matrix sets for adjacent frames, the quantization matrix set used to code the current frame may be adjusted. Such techniques resolve problems with sudden change in quality and inaccurate bitrate results relative to target bitrate 122.

In some embodiments, input video 111 is first downsampled by look ahead video analysis module 101. Then, look ahead video analysis module 101 encodes each downsampled frame via a constant QP encode. The number of generated bits for each frame, the proportion of syntax bits, the proportion of intra coded blocks, and the prediction distortion for the frame may then be provided in analytics data 112. As shown, feature vector generator 102 receives analytics data 112 and feature vector generator 102 generates a feature vector 113 (e.g., a set of features) for each frame of input video 111. Feature vector 113 may include any number of features and the features may be any suitable features representative of the frame that are pertinent to the generation of a highly accurate QP. In some embodiments, feature vector 113 is used to generate an estimated QP for a current frame of a video sequence (i.e., of input video 111) using the current frame and one or more subsequent video frames. As used herein, the term subsequent video frames indicates a frame temporally subsequent or a frame subsequent in an encode order. Such subsequent video frames may be immediately adjacent (i.e., with no intervening frames).

In some embodiments, feature vector 113 includes, for a current frame of input video 111, a number of bits generated for the current frame based on a constant QP encode, the proportion of syntax bits for the current frame based on the constant QP encode, the proportion of intra coded blocks for the current frame based on a constant QP encode, and the prediction distortion for the current frame based on a constant QP encode.

Figure 2:
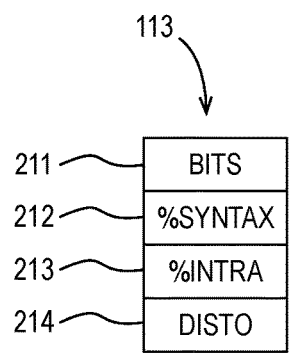
FIG. 2 is an illustrative diagram of an example feature vector for use in quantization parameter estimation for video coding.

FIG. 2 is an illustrative diagram of an example feature vector 113 for use in quantization parameter estimation for video coding, arranged in accordance with at least some implementations of the present disclosure. As shown in FIG. 2, in an embodiment, feature vector 113 includes a number of encode bits 211 (BITS), a proportion of syntax bits 212 (% SYNTAX), a proportion of intra blocks 213 (% INTRA), and a distortion 214. Proportion of syntax bits 212 and proportion of intra blocks 213 may be provided as a percentage, a value in the range of zero to one, or a value in any suitable value range.

In some embodiments, number of encode bits 211, proportion of syntax bits 212, proportion of intra blocks 213, and distortion 214 are generated based on an encode of a current frame or a downsampled version of the current frame (such as a standardized size frame) using simple intra/inter prediction and constant QP. As used herein, the term simple prediction indicates the prediction evaluates limited numbers of available intra and/or inter modes (i.e., using only very few intra directions and simple or no motion estimation), evaluates limited or no partitioning options for blocks, limits or eliminates in loop and out of loop filtering, and so on. Number of encode bits 211 then includes the total number of bits generated based on the simple prediction and/or constant QP encode (Tbits) and proportion of syntax bits 212 is the proportion of those bits that are syntax bits (Sbits/Tbits). Furthermore, proportion of intra blocks 213 is the proportion of blocks of the current frame encoded using an intra mode (intra mode blocks/total blocks). Distortion 214 may be any suitable distortion measure that indicates the difference between actual pixel values (i.e., input pixel values) of a frame or a downsampled frame and predicted pixel values, such as a sum of absolute values of differences, a sum of squares of the differences, or the like. Furthermore, although illustrated with respect to number of encode bits 211, proportion of syntax bits 212, proportion of intra blocks 213, and distortion 214 being in that order, feature vector 113 may include such features in any order and/or additional features.

Figure 3:
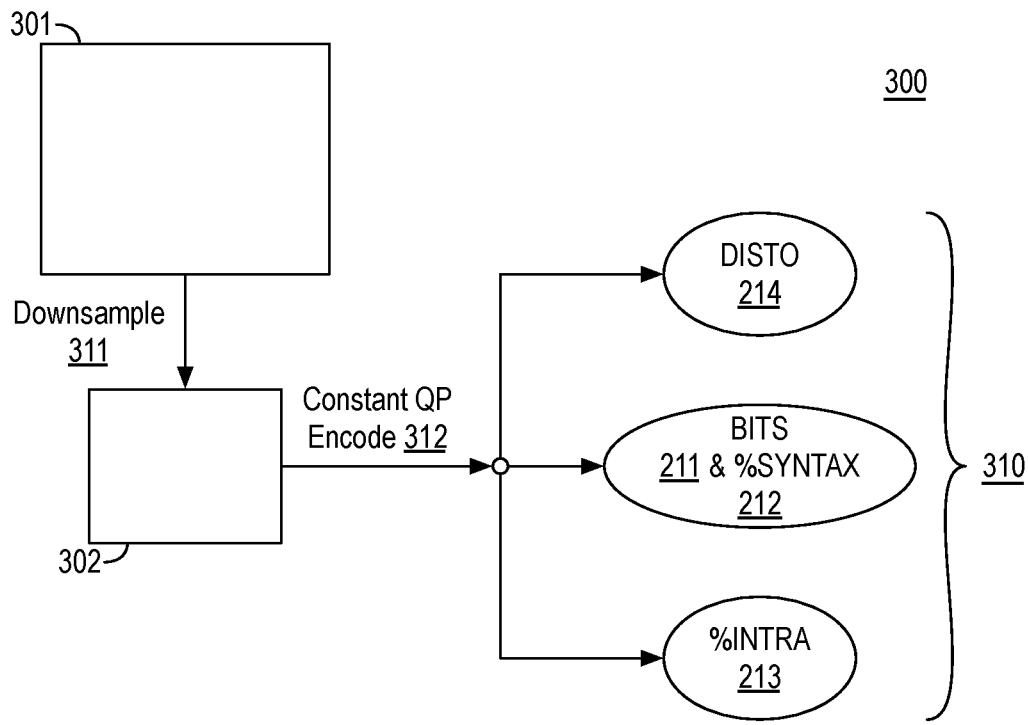
FIG. 3 is an illustrative diagram of exemplary processing to generate features for a feature vector for use in quantization parameter prediction for video coding.

FIG. 3 is an illustrative diagram of exemplary processing 300 to generate features 310 for feature vector 113 for use in quantization parameter prediction for video coding, arranged in accordance with at least some implementations of the present disclosure. As shown in FIG. 3, a current frame 301 is received for processing. Current frame 301 is optionally downsampled by downsample operation 311 to generate a downsampled current frame 302. Such downsampling may be performed using any suitable technique or techniques and at any downsampling rate such as by a factor of two in both the horizontal and vertical dimensions, a factor of four in both dimensions, a factor of eight in both dimensions, or the like. In some embodiments, downsample operation 311 downsamples current frame 301 to a standardized resolution. Notably, features 310 are characterized as corresponding to current frame 301 (and pixels, blocks, etc. thereof) whether downsampling is performed or not.

Processing continues with respect to downsampled current frame 302 or current frame 301 to generate features 310 via constant QP encode 312. Constant QP encode 312 may perform any suitable encode using a constant (and predetermined) QP such as a QP of 32 or 40 for all frames of input video. In some embodiments, constant QP encode 312 of downsampled current frame 302 provides a simplified encode that limits evaluation of some intra/inter modes, partitions, and so on. For example, constant QP encode 312 may provide a limited encode with respect to the encode employed by encoder 107. As shown, constant QP encode 312 is used to generate distortion 214, number of encode bits 211, proportion of syntax bits 212, and proportion of intra blocks 213.

As discussed with respect to FIG. 2, features 310 are employed in any feature vector discussed herein such as feature vector 113. Turning to FIG. 1, feature vector 113 is provided to machine learning based QP estimation module 104. As shown, feature vector 113 and target bitrate 122 (e.g., a target frame size for the current frame) are provided as an input 115 to machine learning based QP estimation module 104, which generates an estimated QP for each frame. Furthermore, in some embodiments estimated QPs 114 for the current and look ahead frames (generated in the same manner) are averaged to generate an estimated group QP (EGQP) 121 for the current frame. For example, estimated group QP 121 may be the average of the estimated QPs of the current frame and the subsequent N−1 frames (in a look ahead window). It is noted that each frame may have estimated QPs 114 estimated group QP 121. Therefore, each frame may have an estimated QP (as provided by application of QP estimation module 104) and an estimated group QP (as provided by averaging the estimated QPs). As shown, estimated QP 114 is provided for optional adjustment by rate control adjustment module 106 and estimated group QP 121 is provided to adaptive QM selection module 105 for use in selection of QM 120. In some embodiments, no averaging is performed and estimated QP 114 is used by adaptive QM selection module 105 for use selection of QM 120.

Furthermore, it is noted that estimated QP 114 is generated using a particular quantization matrix, as discussed further herein below, such that the particular quantization matrix was employed by look ahead video analysis module 101 during constant QP encode 312. In some embodiments, estimated QP 114 is adjusted by rate control adjustment module 106 to a final QP 116 (FQP) for encode by encoder 107. Final QP 116 may also be characterized as an encode QP. Furthermore, in some embodiments, feature vector 113 is pre-processed such that the overall input data values are transformed to certain ranges with means that are close to zero. Such techniques improve hardware implementation and improve model training and accuracy. Machine learning based QP estimation module 104 may employ any pretrained machine learning model. In some embodiments, machine learning based QP estimation module 104 implements a neural network model.

Figure 4:
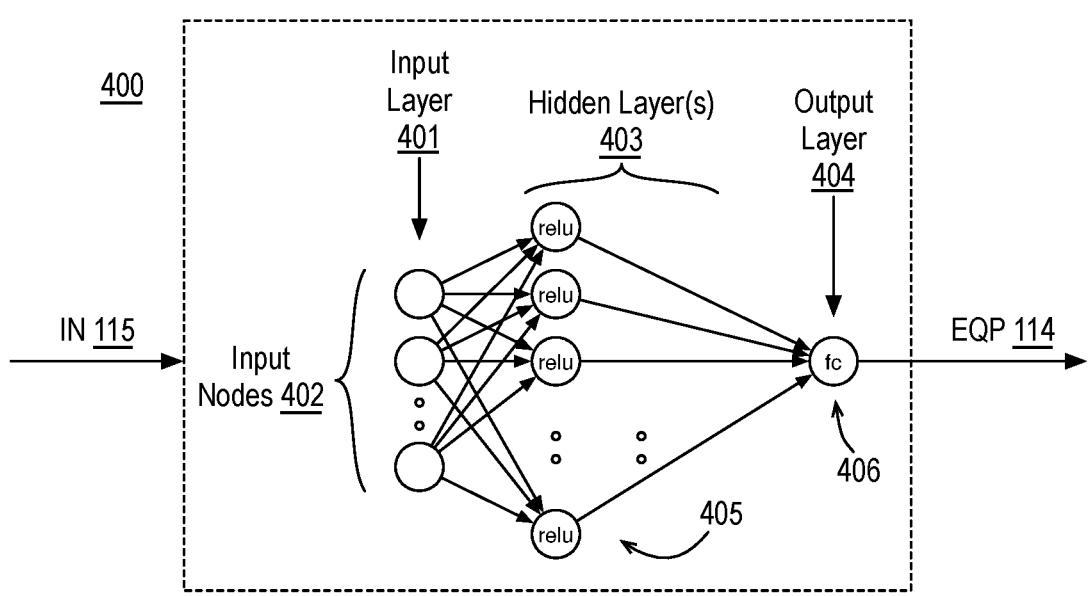
FIG. 4 illustrates an example deep neural network for determination of an estimated quantization parameter for a frame.

FIG. 4 illustrates an example deep neural network 400 for determination of an estimated quantization parameter for a frame, arranged in accordance with at least some implementations of the present disclosure. As used herein, the term neural network indicates any model or algorithm built using interconnected nodes between an input layer of nodes and an output layer node or nodes. For example, deep neural network 400 may be implemented via machine learning based QP estimation module 104 and based on inputs 115. As shown in FIG. 4, deep neural network 400 may include an input layer 401 having any number of input nodes 402, one or more hidden layers 403 having hidden layer nodes 405, and an output layer 404 having a single output layer node 406. Deep neural network 400 may include any suitable number of input nodes 402, hidden layer nodes 405, and output nodes 406. Input layer 401 may include any suitable number of nodes such as a number of nodes equal to the number of elements in input 115 or a feature vector thereof.

Furthermore, as in the illustrated example, deep neural network 400 includes a single hidden layer 403, in accordance with some embodiments, However, deep neural network 400 may include any number of hidden layers 403 having any number of nodes. In some embodiments, deep neural network 400 has two hidden layers 403. In some embodiments, deep neural network 400 has three hidden layers 403. More hidden layers may be employed. As shown, in some embodiments, each hidden layer node 405 implements a rectified linear unit (relu) as the activation thereof. However, any suitable activation functions may be employed. In some embodiments, output layer node 406 provides fully connected summation of the inputs thereto. In some embodiments, the resultant output layer value is converted to a closest integer and provided as estimated QP 114. Although illustrated with respect to deep neural network 400, machine learning based QP estimation module 104 may implement any neural network or machine learning model. Such a machine learning model may be pretrained by selecting a training set of frames, building a corpus of ground truth mapping by constant encode QP sweeping (coding each frame with each available QP), and training the machine learning model using the training corpus mapping.

Returning to FIG. 1, as shown, estimated group QP 121 (or estimated QP 114 when estimated group QP 121 is not employed) is used to determine a quantization matrix 120 (QM) as an encode QM for use by encoder 107, subject to adjustment as discussed further herein. Furthermore, estimated QP 114 In some embodiments, used to encode the current frame or estimated QP 114 may be optionally adjusted by rate control adjustment module 106 to final QP 116 for use by encoder 107 to encode the current frame. Encoder 107 then encodes the current frame using QM 120 and estimated QP 114 or final QP 116 to generate bitstream 117. Encoder 107 may encode the current frame using any suitable technique or techniques such as standards compliant coding techniques. In an embodiment, QM 120 and estimated QP 114 or final QP 116 are implemented for the current frame during a quantization of transform blocks and/or residual transform blocks of the current frame as is known in the art.

As discussed, estimated group QP 121 (or estimated QP 114) is used to determine QM 120. In some embodiments, offline QM training module 103 provides QM to sub-range correspondences 119, which may be stored to memory of system 100, generated as discussed further herein below. QM to sub-range correspondences 119 include any suitable data structure that maps estimated group QP 121 to a particular set of quantization matrices (e.g., the set including a quantization matrix for each block size) such that each available QP has a corresponding set of quantization matrices. The generation of QM to sub-range correspondences 119 during a training phase is discussed further herein below.

In an implementation phase, adaptive QM selection module 105 receives estimated group QP 121 and QM to sub-range correspondences 119. Adaptive QM selection module 105 determines which particular sub-range of any number of sub-ranges of an available QP range that estimated group QP 121 is within. Adaptive QM selection module 105 then selects a set of quantization matrices (including a quantization matrix for each block size) based on estimated group QP 121 being within the particular sub-range. Such quantization matrices may have any characteristics discussed herein.

Figure 5:
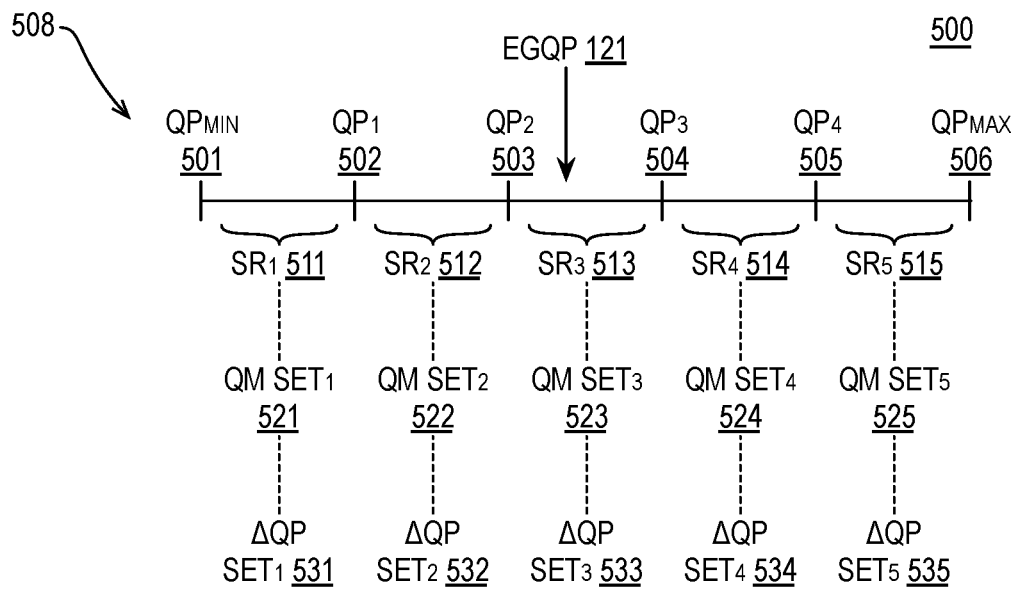
FIG. 5 illustrates an example quantization matrix set selection operation based on an example estimated group QP.

FIG. 5 illustrates an example quantization matrix set selection operation 500 based on an example estimated group QP 121, arranged in accordance with at least some implementations of the present disclosure. As shown, an available QP range 508 may be divided into any number of sub-ranges (SR) 511, 512, 513, 514, 515. As discussed, available QP range 508 may be any suitable QP range such as an available of QPs based on implementation of a standards based codec. In the illustrated example, available QP range 508 ranges from a minimum available QP 501 to a maximum available QP 506. Furthermore, sub-ranges 511, 512, 513, 514, 515 are defined as extending between dividing QP values 502, 503, 504, 505. It is noted that dividing QP values 502, 503, 504, 505 may define sub-ranges 511, 512, 513, 514, 515 in any manner. For example, dividing QP values 502, 503, 504, 505 may be included in the lower range (e.g., dividing QP value 502 is in sub-range 511, dividing QP value 503 is in sub-range 512, dividing QP value 504 is in sub-range 513, and dividing QP value 505 is in sub-range 514), dividing QP values 502, 503, 504, 505 may be included in the higher range (e.g., dividing QP value 502 is in sub-range 512, dividing QP value 503 is in sub-range 513, dividing QP value 504 is in sub-range 514, and dividing QP value 505 is in sub-range 515), or dividing QP values 502, 503, 504, 505 may be between sub-ranges 511, 512, 513, 514, 515 (and therefore not define available QPs for encode). In the illustrated example, five sub-ranges 511, 512, 513, 514, 515 are employed. However, any number of sub-ranges 511, 512, 513, 514, 515 of two or more may be used such as three, four, six, or seven sub-ranges.

As shown, each of sub-ranges 511, 512, 513, 514, 515 has a corresponding set of quantization matrices 521, 522, 523, 524, 525 having features as discussed herein below. Notably, each of quantization matrices 521, 522, 523, 524, 525 has a quantization matrix for each size of transform matrix needed for deployment by encoder 107. It is noted that some matrices may be shared across sets of quantization matrices 521, 522, 523, 524, 525 although at least one matrix is unshared between each of sub-ranges 511, 512, 513, 514, 515.

As discussed with respect to adaptive QM selection module 105, quantization matrix set selection operation 500 proceeds based on estimated group QP 121 being within a particular sub-range of sub-ranges 511, 512, 513, 514, 515. Then, a corresponding set of quantization matrices 521, 522, 523, 524, 525 is selected based estimated group QP 121 being within the particular sub-range. In the illustrated example, estimated group QP 121 is within sub-range 513 and set of quantization matrices 523 is used for encode of the current frame.

In some embodiments, quantization matrices 521 for sub-range 511 include one or more flat quantization matrices. In some embodiments, quantization matrices 521 for sub-range 511 include all flat quantization matrices. As used herein, the term flat quantization matrix indicates a quantization matrix having the same value in every position. In some embodiments, quantization matrices 522, 523, 524, 525 include quantization matrices as discussed with respect to FIGS. 7-9 herein.

In addition, each of sub-ranges 511, 512, 513, 514, 515 has a corresponding set of QP adjustments 531, 532, 533, 534, 535 that are implemented when a set of quantization matrices was selected for a current frame using a prior (different) set of quantization matrices implemented as part of the constant QP encode. For example, estimated QP 114 and estimated group QP 121 may be generated using a prior set of quantization matrices (e.g., set of quantization matrices 512). Then, based on estimated group QP 121 being in sub-range 513, set of quantization matrices 523 may be selected for encode of the current frame. In such contexts, a QP adjustment is applied by rate control adjustment module 106 for the current frame to avoid shifts in subjective quality and/or to provide a resultant bit rate for the current frame that more closely matches target bitrate 122. In the discussed example, the selected set of quantization matrices 523 is in a higher sub-range of QPs than set of quantization matrices 522 used to predict estimated QP 114. In response to such a shift in QP sub-range, the corresponding QP adjustment (or delta) is negative. Alternatively, when quantization matrices used to predict estimated QP 114 are higher that the sub-range of QPs of the selected quantization matrices, the corresponding QP adjustment (or delta) is positive. Such QP adjustments (or deltas) are determined in a pretraining phase as discussed with respect to FIG. 6 and stored as sets of QP adjustments 531, 532, 533, 534, 535.

For example, set of QP adjustments 531 may include QP adjustments for scenarios where quantization matrices 521 are selected for encode using encode statistics generated using each of quantization matrices 522, 523, 524, 525, set of QP adjustments 532 may include QP adjustments for scenarios where quantization matrices 522 are selected for encode using encode statistics generated using each of quantization matrices 521, 523, 524, 525, set of QP adjustments 533 may include QP adjustments for scenarios where quantization matrices 523 are selected for encode using encode statistics generated using each of quantization matrices 521, 522, 524, 525, set of QP adjustments 534 may include QP adjustments for scenarios where quantization matrices 524 are selected for encode using encode statistics generated using each of quantization matrices 521, 522, 523, 525, and set of QP adjustments 535 may include QP adjustments for scenarios where quantization matrices 525 are selected for encode using encode statistics generated using each of quantization matrices 521, 522, 523, 524.

Discussion now turns to techniques for selecting the quantization matrices of sets of quantization matrices 521, 522, 523, 524, 525 and QP adjustments 531, 532, 533, 534, 535. Furthermore, such discussion describes the characteristics of matrices deployed in sets of quantization matrices 521, 522, 523, 524, 525. It is to be understood that any quantization matrix or characteristic discussed with respect to a training or set-up phase may be deployed in a deployment phase via QM to sub-range correspondences 119.

Figure 6:
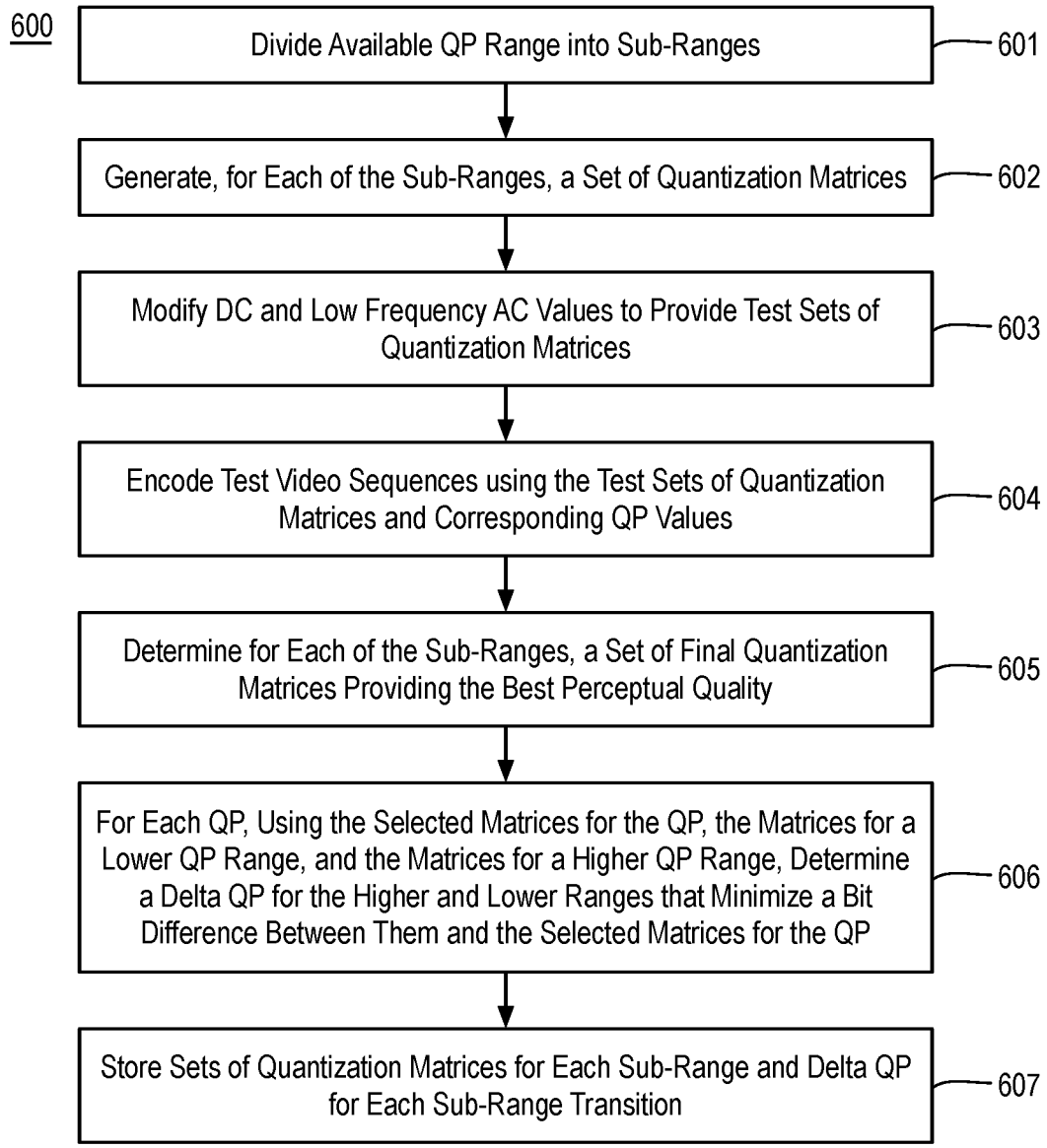
FIG. 6 is a flow diagram illustrating an example process for defining quantization parameter sub-ranges, selecting corresponding quantization matrices, and defining corresponding quantization parameter adjustments.

FIG. 6 is a flow diagram illustrating an example process 600 for defining quantization parameter sub-ranges, selecting corresponding quantization matrices, and defining corresponding quantization parameter adjustments, arranged in accordance with at least some implementations of the present disclosure. Process 600 may include one or more operations 601-607 as illustrated in FIG. 6. Process 600 may be performed by a device or system to generate quantization parameter sub-ranges and a corresponding set of quantization matrices and corresponding set of quantization parameter adjustments for each quantization parameter sub-range.

Process 600 begins at operation 601, where an available QP range (i.e., as defined by a codec specification) is divided into sub-ranges. The available QP range may be divided into any number of sub-ranges of the same or different sizes. For example, M QP ranges (QP[1], QP[2], . . . , QP[M]) may be defined.

Processing continues at operation 602, where, for each of the sub-ranges, a set of quantization matrices are generated. The set of quantization matrices for each sub-range include a quantization matrix for each size block to be coded. Notably, it was found that optimal quantization matrices are different for different content even with the same bitrate. Instead, optimal quantization matrices are highly correlated with the actual quantization encoding quantization scale used. In contrast to prior quantization matrices, which drastically vary the QM values from the DC value outward, it was found that providing similar or the same QM values between the DC QM value and neighboring AC values provided improved subjective performance.

Figure 7:
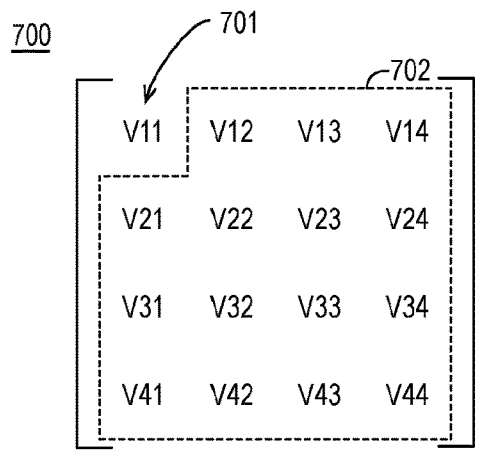
FIG. 7 illustrates an example quantization matrix for video coding.

FIG. 7 illustrates an example quantization matrix 700 for video coding, arranged in accordance with at least some implementations of the present disclosure. As shown in FIG. 7, a 4×4 quantization matrix 700 includes a matrix of values illustrated QM values V11, V12, V13, V14 in a first row, V21, V22, V23, V24 in a second row, and so on, and QM values V11, V21, V31, V41 in a first column, and so on. Notably, quantization matrix 700 has one DC QM value 701 (V11) and 4×4−1=15 AC QM values 702. As disused, DC QM value 701 indicates a lowest frequency value or component and AC QM values 702 indicates all other values with increasing frequency of such components increases moving away from the DC QM value 701. In typical QMs, increasing QM values are provided radiating away from DC QM value 701 (i.e., V11<V12<V13<V14<V24<V34<V44 and V12=V21, V13=V22=V31, V14=V23=V32=V41, V24=V33=V42, V34=V43 with exemplary values of V11=6, V12=13, V13=20, V14=28, V24=32, V34=37, V44=42).

In contrast, the quantization matrices selected herein use the same or very similar (offset by 1 or 2) values for DC QM value 701 and those AC QM values 702 adjacent to or one value removed from DC QM value 701. It is noted that the quantization matrices discussed herein are 4×4 quantization matrices, but the principles apply to larger quantization matrices such as 8×8 quantization matrices and 16×16 quantization matrices. In such contexts the discussed neighborhoods may be expanded to include addition QM values.

Figure 8:
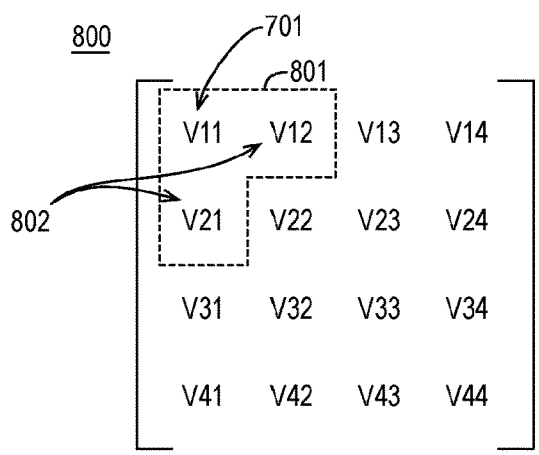
FIG. 8 illustrates an example quantization matrix for video coding having an example neighborhood of like quantization matrix values.

FIG. 8 illustrates an example quantization matrix 800 for video coding having an example neighborhood 801 of like quantization matrix values, arranged in accordance with at least some implementations of the present disclosure. As shown in FIG. 8, neighborhood 801 is defined in quantization matrix 800 as inclusive of DC QM value 701 (V11) and adjacent AC QM values 802 (V12, V21). The term adjacent with respect to adjacent QM values indicates no QM value is between the adjacent QM values. In quantization matrix 800, DC QM value 701 and adjacent AC QM values 802 within neighborhood 801 are provided as having like QM values. As used with respect to QM values the term like values indicates the values are the same or have a difference of not more than two. The term like values is inclusive of same or equal values.

In addition to neighborhood 801 inclusive of V11, V12, V21, quantization matrix 800 may include additional neighborhoods (not shown) such as neighborhoods along each lower left to upper right diagonal (e.g., N2 including V31, V22, V13 of like values; N3 including V41, V32, V23, V14 of like values; N4 including V42, V33, V24 of like values; and N5 including V43, V34 of like values). In some embodiments, such additional neighborhoods combine some diagonals (e.g., N2 including V31, V22, V13, V41, V32, V23, V14 of like values and N3 including V42, V33, V24, V43, V34 of like values). Such like values may be the same for example. Other neighborhood combinations are available.

Figure 9:
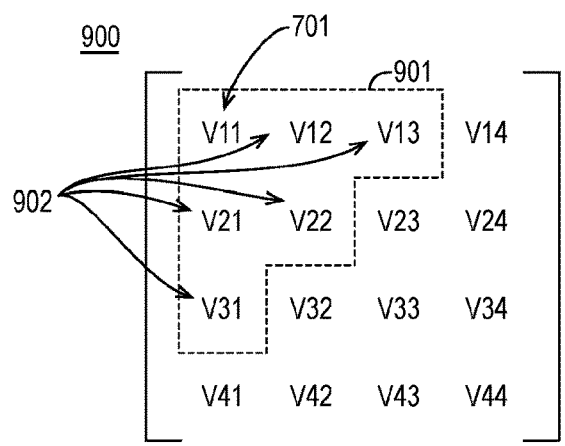
FIG. 9 illustrates another example quantization matrix for video coding having another example neighborhood of like quantization matrix values.

FIG. 9 illustrates another example quantization matrix 900 for video coding having another example neighborhood 901 of like quantization matrix values, arranged in accordance with at least some implementations of the present disclosure. In the example of FIG. 9, neighborhood 901 is defined in quantization matrix 900 as inclusive of DC QM value 701 (V11) and adjacent AC QM values 902 (V12, V13, V21, V22, V31). In quantization matrix 900, DC QM value 701 and adjacent AC QM values 902 within neighborhood 901 are again provided as having like QM values such that the values are the same or are have a difference of not more than two.

In addition to neighborhood 901, quantization matrix 900 may again include additional neighborhoods (not shown) such as neighborhoods along each lower left to upper right diagonal (e.g., N2 including V41, V32, V23, V14 of like values; N3 including V42, V33, V24 of like values; and N4 including V43, V34 of like values). In some embodiments, such additional neighborhoods combine some diagonals (e.g., N2 including V41, V32, V23, V14, V42, V33, V24 of like values and N3 including V43, V34, V44 of like values). Such like values may be the same for example.

In some embodiments, all values within neighborhood 901 are the same (e.g., V11=V12=V21=V31=V22=V13), all values along the diagonal adjacent to neighborhood 901 (in a second neighborhood) are the same (e.g., V14=V23=V32=V41) and greater than the value within neighborhood 901, all values along the diagonal adjacent to the second neighborhood (in a third neighborhood) are the same (e.g., V42=V33=V24) and greater than the value within the second neighborhood, all values along the diagonal adjacent to the third neighborhood (in a fourth neighborhood) are the same (e.g., V43=V34) and greater than the value within the third neighborhood, and a final value (V44) is greater than the value in the fourth neighborhood. For one particular example, in the context of AVC for a sub-range from QP 32 to 38, the following values may be employed: V11=21, V14=24, V24=26, V34=29, V44=32).

Returning to FIG. 6, processing continues at operation 603, where the DC and low frequency AC values are modified to provide test sets of quantization matrices. Such DC and low frequency AC values may be modified using any suitable technique or techniques. In some embodiments, each modification generates a new test set for evaluation and testing. In some embodiments, the DC and low frequency AC values are defined by the neighborhoods discussed with respect to FIGS. 8 and 9. For example, the DC and low frequency AC values may be the DC value and the AC values adjacent to the DC value (e.g., 3 total values: V11, V12, V21), the DC value, the adjacent AC values and values adjacent to the adjacent AC values (e.g., 6 total values: V11, V12, V21, V31, V22, V13).

The applied modifications or offsets may include any number and values of offsets. In some embodiments, +/−1, +/−2, +/−3 offsets are used. In addition or in the alternative, other values of the quantization matrices may also be adjusted. Furthermore, in some embodiments, the test sets of quantization matrices include one or more flat quantization matrices. In some embodiments, the test sets of quantization matrices for a lowest QP range (e.g., minimum available QP 501 to QP value 502) includes one or more flat matrices for the quantization matrices.

Processing continues at operation 604, where test video sequences are encoded using the test sets of quantization matrices and corresponding values (e.g., in the pertinent ranges). Such test video sequences may be selected to represent a wide range of video scenarios and they may be encoded using any suitable encode process to be deployed in an implementation phase.

Processing continues at operation 605, where, for each of the sub-ranges, a set of final quantization matrices are determined or selected for deployment based on a best perceptual quality. In some embodiments, the best perceptual quality is determined by decoding the encoded test video sequences and evaluating the decoded video using perceptual quality evaluation techniques such as video multi-method assessment fusion (VMAF) techniques, multi-scale structural similarity index techniques, or the like for each QP. Notably, such sets of final quantization matrices may be stored for implementation via QM to sub-range correspondences 119.

Processing continues at operation 606, where sets of QP adjustments (e.g., sets of QP adjustments 531, 532, 533, 534, 535) are generated. For example, for each QP, using the selected quantization matrices for the QP (as generated at operation 605), the quantization matrices for a lower QP range, and the quantization matrices for a higher QP range, a delta QP is determined for the higher and lower QP ranges that minimizes a bit difference between them and the selected quantization matrices for the QP. That is, such QP adjustments provide a prediction as to the QP adjustment needed for coding using a particular set of quantization matrices when a higher or lower set of quantization matrices was used to predict the QP for a frame.

For example, for each available QP provided in operation 601, the selected matrices (at operation 605) for this QP, the matrices for lower QP range and matrices for higher QP range are used to encode a test clip, the delta QP for matrices for lower QP range and the delta QP for matrices for higher QP range found to minimize the bits difference between them and the selected matrices for this QP are determined. For example, assuming a QP range [48, 49, 50, 51] maps to QM5, QP range [42, 43, 44, 45, 46, 47] maps to QM4 and QP range [38, 39, 40, 41] maps to QM3, QM4 and QP=48 are used to encode the training clips to record the QM4 encoded bits, then QM5 and reduced QP (e.g., reduced 1 by 1 from 48) to encode the training clips until a QP_reduce48 is found that minimize the bits difference between QM5 and QM4. The delta QP for QM4 to QM5 transition can then be determined as QP_reduce48-48. Similarly, the delta QP for QM5 to QM4 transition can be determined as 47-QP_reduce48. The delta QP for QM3 to QM4 transition can be determined as QP_reduce42-42, the delta QP for QM4 to QM3 transition may be determined as 41-QP_reduce42, and so on.

Processing continues at operation 607, where the final sets of quantization matrices determined at operation 605 and the sets of delta QPs determined at operation 606 are stored for deployment via QM to sub-range correspondences 119.

Returning to FIG. 1, in deployment, such final sets of quantization matrices are used, as discussed, in response to estimated group QP 121 being within a particular QP sub-range. Such final sets of quantization matrices may have any characteristics discussed herein. In some embodiments, sub-range 511 uses all flat quantization matrices. In some embodiments, one or more of sub-ranges 512, 513, 514, 515 have a quantization matrix with an entry corresponding to a DC coefficient and an entry corresponding to an AC coefficient that have the same value. For example, as discussed with respect to neighborhoods 801, 901, such neighborhoods 801, 901 may have entries that are all the same value. In some embodiments, one or more of sub-ranges 512, 513, 514, 515 have a quantization matrix with an entry corresponding to a DC coefficient and an entry corresponding to an adjacent AC coefficient that have a difference of one or two (e.g., a greater value by one or two). For example, in neighborhood 801, DC QM value 701 may have a first value and all other AC QM values 802 may have a second value that is one or two greater than the first value. Similarly, in neighborhood 901, DC QM value 701 may have a first value and all other AC QM values 802 may have a second value that is one or two greater than the first value.

Furthermore, moving from sub-range 512 to sub-range 513 to sub-range 514 to sub-range 515, in some embodiments, differences between entry values within some matrices may increase. For example, a first difference between an entry corresponding to a DC coefficient and an entry corresponding to an AC coefficient in a quantization matrix for sub-range 512 may be less than a second difference between an entry corresponding to the DC coefficient and an entry corresponding to the AC coefficient in a quantization matrix for sub-range 513. Notably, in such contexts the entries are in the same positions of the quantization matrices. Such increasing differences may also apply moving from sub-range 513 to sub-range 514 and from sub-range 514 to sub-range 515.

As shown in FIG. 1, encoder 107 encodes current frame using final QP 116 and quantization matrix 120. In some embodiments, estimated QP 114 is adjusted to generate final QP 116. In some embodiments, the quantization matrix used to encode the current frame may also be adjusted. Discussion now turns to such modifications.

Figure 10:
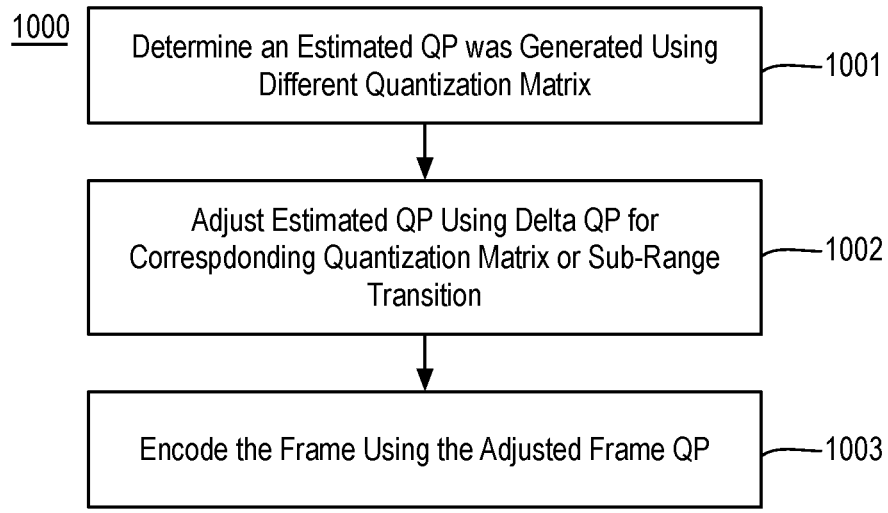
FIG. 10 is a flow diagram illustrating an example process for adjusting an estimated quantization parameter to a final encode quantization parameter.

FIG. 10 is a flow diagram illustrating an example process 1000 for adjusting an estimated quantization parameter to a final encode quantization parameter, arranged in accordance with at least some implementations of the present disclosure. In particular, FIG. 10 offers techniques to handle instances where a selected quantization matrix for a frame differs from the quantization matrix used to generate analytics data, generate a feature vector, generate an estimated group quantization parameter for the frame, and ultimately select a quantization matrix. In such contexts, inaccurate and undesirable bitrates may result that differ from the target bitrate of the frame, which causes reduced coding quality and inefficiencies. Process 1000 may include one or more operations 1001-1003 as illustrated in FIG. 10. Process 1000 may be performed by a device or system to adjust quantization parameters for encode. For example, process 1000 may be performed by system 100 and reference is made to FIG. 1 in the following discussion.

Process 1000 begins at operation 1001, where a determination is made that an estimated QP for a particular frame was generated using a different quantization matrix than the quantization matrix selected for encode of the frame. Such detection may be performed using any suitable technique or techniques such as tracking the quantization matrix used to generate the estimated QP and comparing it to the selected quantization matrix for the frame.

Processing continues at operation 1002, where the estimated QP is adjusted using a delta QP corresponding to the quantization matrix (or sub-range) transition. For example, such QP adjustments employ the QP adjustments generated at operation 605 of process 600. In some embodiments, the QP adjustment is negative when the quantization matrix used to estimate the estimated QP is in a sub-range having lower QPs than the quantization matrix selected for encoding. In some embodiments, the QP adjustment is positive when the quantization matrix used to estimate the estimated QP is in a sub-range having higher QPs than the quantization matrix selected for encoding. For example, determination of a more aggressive quantization matrix for encode (quantization matrix 120; e.g., having greater entry values and causing greater quantization with more quantized coefficients tending to zero) than that used to select the estimated QP (e.g., estimated QP 114 as selected using a quantization matrix other than quantization matrix 120) would tend to cause the encoded frame to use fewer bits than the target bitrate (target bitrate 122). Such a bitrate miss causes lower quality and other problems. To counteract such negative impacts, the estimated QP is adjusted (lowered) to increase the bitrate to or nearer the target bitrate. For example, estimated QP 114 is adjusted to final QP 116 for use by encoder 107. As discussed, such QP adjustments are pretrained using example training clips and the techniques discussed with respect to process 600.

Similarly, determination of a less aggressive quantization matrix for encode (quantization matrix 120; e.g., having lower entry) than that used to select the estimated QP (e.g., estimated QP 114 as selected using a quantization matrix other than quantization matrix 120) would tend to cause the encoded frame to use more bits than the target bitrate (target bitrate 122). To counteract corresponding negative impacts, the estimated QP is adjusted (increased) to reduce the bitrate to or nearer the target bitrate. For example, estimated QP 114 is adjusted to final QP 116 for use by encoder 107. Such QP adjustments are again pretrained using example training clips and the techniques discussed with respect to process 600.

Processing continues at operation 1003, where the current frame is encoded using the adjusted final QP and the selected quantization matrix. For example, encoder 107 receives final QP 116 and quantization matrix 120 and encoder 107 encodes the current frame using final QP 116 and quantization matrix 120 in accordance with a standardized codec.

Figure 11:
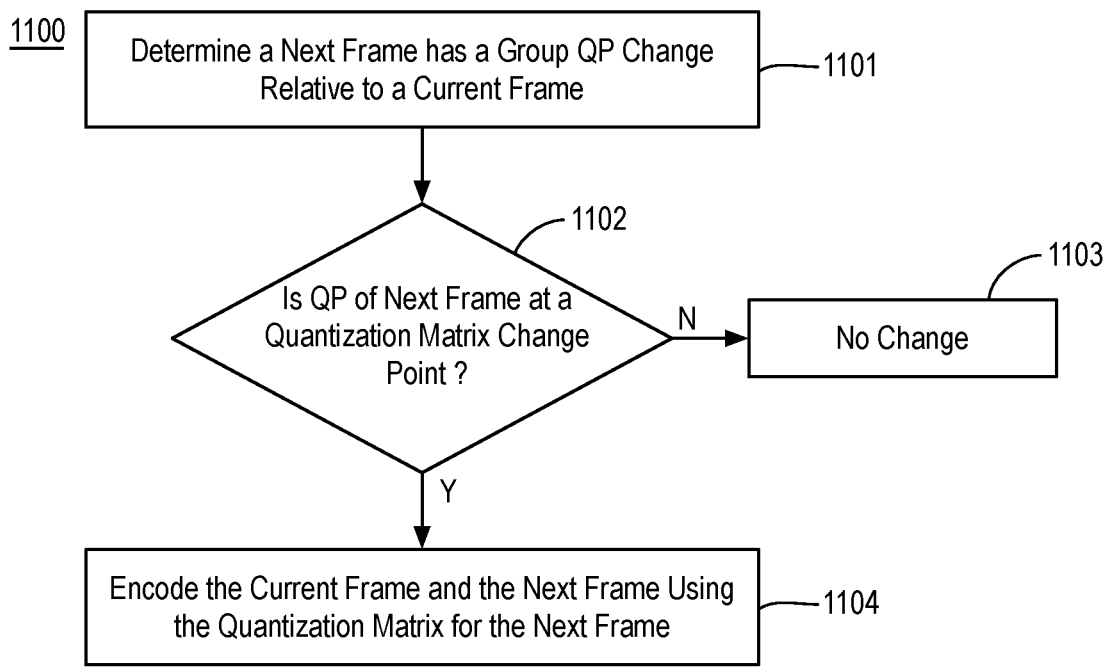
FIG. 11 is a flow diagram illustrating an example process for modifying selection of a quantization matrix for improved performance stability.

FIG. 11 is a flow diagram illustrating an example process 1100 for modifying selection of a quantization matrix for improved performance stability, arranged in accordance with at least some implementations of the present disclosure. In particular, FIG. 11 offers techniques to prevent oscillations between selected matrices between frames. For example, the techniques discussed herein provide a set of quantization matrix transition points (dividing QP values 502, 503, 504, 505 or QP[1] to [N]) to switch quantization matrix selection. To prevent oscillations, process 1000 adaptively adjusts the transition QP based on estimated QP movement directions. Process 1100 may include one or more operations 1101-1104 as illustrated in FIG. 11. Process 1100 may be performed by a device or system to modify quantization matrix selection. For example, process 1100 may be performed by system 100.

Process 1100 begins at operation 1101, where a determination is made as to whether a next frame has a group QP change relative to a group QP of a current frame. As discussed, such group QPs are used to select a corresponding set of quantization matrices. In context where estimated QPs are used to select sets of quantization matrices, estimated QPs are used in place of group QPs.

Processing continues at operation 1102, where a determination is made as to whether the group QP of the next frame is at a quantization matrix change point. Such a determination may be made using any suitable technique or techniques such that the quantization matrix change point QP defines a change in quantization matrices to be applied to the next frame relative to the current frame. In some embodiments, when the group QP change is an increase in group QP, the quantization matrix change point is a lowest QP value in a sub-range (e.g., a next higher sub-range). In some embodiments, when the group QP change is a decrease in group QP, the quantization matrix change point is a highest QP value in a sub-range (e.g., a next higher sub-range). For example, with reference to FIG. 5, when moving from sub-range 511 to sub-range 512, the quantization matrix change point may be the lowest QP value in sub-range 512 and, when moving from sub-range 513 to sub-range 512, the quantization matrix change point may be the highest QP value in sub-range 512. The quantization matrix change point may be characterized as quantization matrix switching QP, a matrix switching QP, or the like. Such terms indicate a QP value that indicates a change from one sub-range to another (and from one set of quantization matrices to another set).

When the group QP of the next frame is not a quantization matrix change point, quantization matrix switching QP, or matrix switching QP, processing continues at operation 1103 where no change is made to the set of quantization matrices of the next frame nor the set of quantization matrices of the current frame and the selected sets of quantization matrices are used to encode the current and next frames.

When the group QP of the next frame is a quantization matrix change point, quantization matrix switching QP, or matrix switching QP, processing continues at operation 1104, where the set of quantization matrices for the current frame are changed to those of the next frame and both the current frame and the next frame are encoded using the set of quantization matrices for the current frame. Such techniques smooth out quantization matrices selection across frames and remove oscillations. It is noted that when, for either the current or next frame, the set of quantization matrices to be used for encode were not used to select the estimated QP for the frame, process 1000 may be performed prior to encode to adjust the estimated QP for the current or next frame or both. For example, with reference to FIG. 5, when a current frame is in sub-range 512 (and is therefore to apply set of quantization matrices 522) and a next frame has an estimated group QP in sub-range 513 (or sub-range 511), then set of quantization matrices 523 (or quantization matrices 521) may be applied to both the current and next frames.

In some embodiments, assuming the estimated QP of a current frame is larger (e.g., QP_current=QP_next+c, where c is an offset value which can be 1 or 2) than the estimated QP of a next frame and the estimated QP of the next frame maps to a new QM, the QM switching starts from the current frame instead of next frame. In some embodiments, assuming the estimated QP of a current frame is less (e.g., QP_current=QP_next−c, where c is an offset value which can be 1 or 2) than the estimated QP of a next frame and the estimated QP of the next frame maps to a new QM, the QM switching starts from the current frame instead of the next frame. Such procedures may be applied to one switch point or to multiple switch point. For example, assuming a QP range [48, 49, 50, 51] maps to QM5 and another QP range [42, 43, 44, 46, 47] maps to QM4: if QP_current=48 and QP_next=47, the current frame would use QM4; if QP_current=47 and QP_next=48, the current frame would use QM5.

Figure 12:
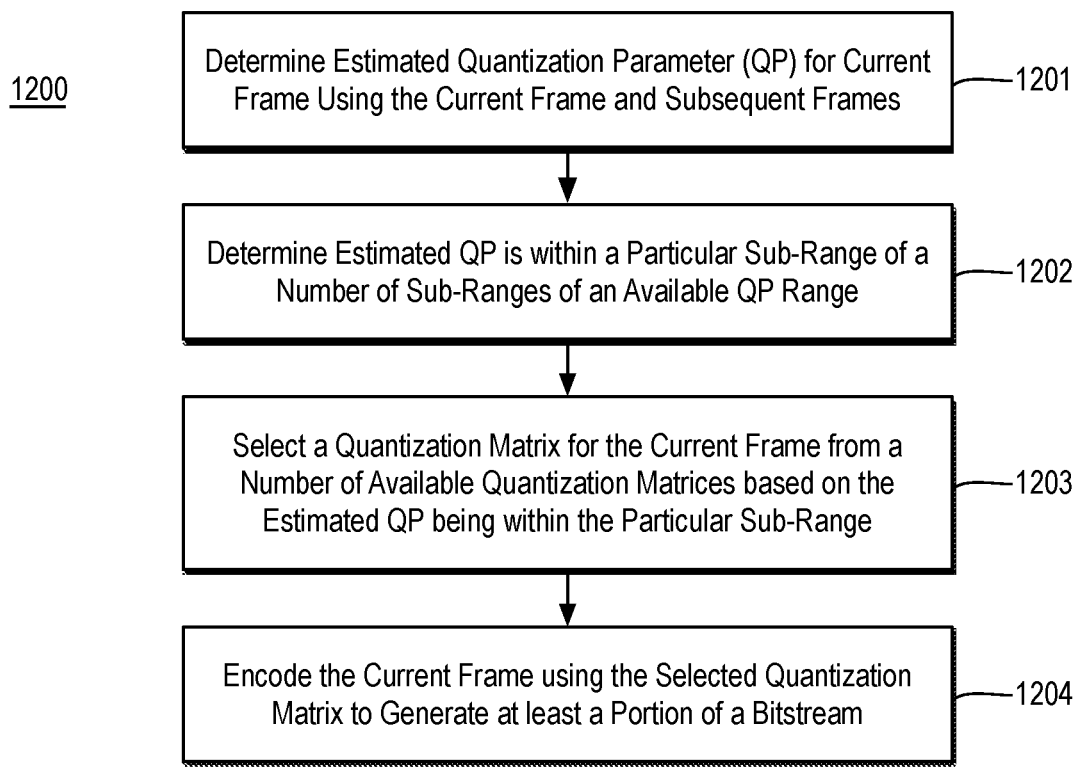
FIG. 12 is a flow diagram illustrating an example process for video coding including adaptive quantization matrix selection.

FIG. 12 is a flow diagram illustrating an example process 1200 for video coding including adaptive quantization matrix selection, arranged in accordance with at least some implementations of the present disclosure. Process 1200 may include one or more operations 1201-1204 as illustrated in FIG. 12. Process 1200 may form at least part of a video coding process. By way of non-limiting example, process 1200 may form at least part of a video coding process as performed by any device or system as discussed herein such as system 100. Furthermore, process 1200 will be described herein with reference to system 1300 of FIG. 13.

Figure 13:
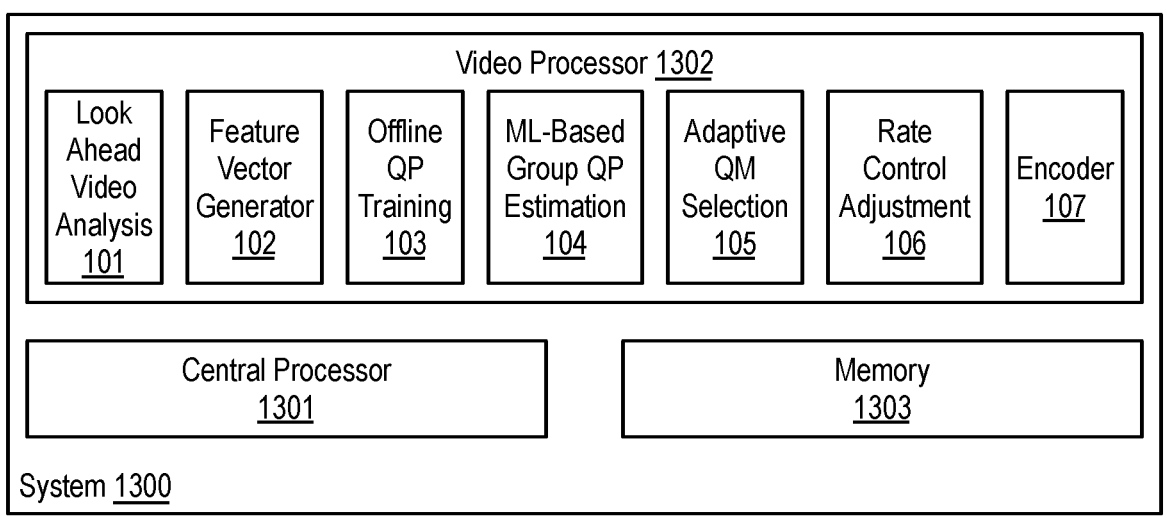
FIG. 13 is an illustrative diagram of an example system for video coding including adaptive quantization matrix selection.

FIG. 13 is an illustrative diagram of an example system 1300 for video coding including adaptive quantization matrix selection, arranged in accordance with at least some implementations of the present disclosure. As shown in FIG. 13, system 1300 may include a central processor 1301, a video processor 1302, and a memory 1303. Also as shown, video processor 1302 may include or implement look ahead video analysis module 101, feature vector generator 102, offline quantization matrices QM training module 103, machine learning based QP estimation module 104, adaptive QM selection module 105, rate control adjustment module 106, and encoder 107. In the example of system 1300, memory 1303 may store video data or related content such as frame data, analytics data, feature values, feature vectors, target frame rates, bitrates, encoded data, model parameter data, quantization parameters, quantization matrices, sub-range data, bitstream data, and/or any other data as discussed herein.

As shown, in some embodiments, video processor 1302 implements look ahead video analysis module 101, feature vector generator 102, offline quantization matrices QM training module 103, machine learning based QP estimation module 104, adaptive QM selection module 105, rate control adjustment module 106, and encoder 107. In some embodiments, one or more of look ahead video analysis module 101, feature vector generator 102, offline quantization matrices QM training module 103, machine learning based QP estimation module 104, adaptive QM selection module 105, rate control adjustment module 106, and encoder 107 are implemented by central processor 1301, a graphics processor, or the like.

Video processor 1302 may include any number and type of video, image, or graphics processing units that may provide the operations as discussed herein. Such operations may be implemented via software or hardware or a combination thereof. For example, video processor 1302 may include circuitry dedicated to manipulate frames, frame data, or the like obtained from memory 1303. Central processor 1301 may include any number and type of processing units or modules that may provide control and other high level functions for system 1300 and/or provide any operations as discussed herein. Memory 1303 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1303 may be implemented by cache memory.

In an embodiment, one or more or portions of look ahead video analysis module 101, feature vector generator 102, offline quantization matrices QM training module 103, machine learning based QP estimation module 104, adaptive QM selection module 105, rate control adjustment module 106, and encoder 107 are implemented via an execution unit (EU). The EU may include, for example, programmable logic or circuitry such as a logic core or cores that may provide a wide array of programmable logic functions. In an embodiment, one or more or portions of look ahead video analysis module 101, feature vector generator 102, offline quantization matrices QM training module 103, machine learning based QP estimation module 104, adaptive QM selection module 105, rate control adjustment module 106, and encoder 107 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 12, process 1200 begins at operation 1201, where an estimated quantization parameter (QP) is determined for a current frame of a video sequence using the current frame and one or more frames subsequent to the current frame. The estimated QP may be determined using any suitable technique or techniques. In some embodiments, determining the estimated quantization parameter for the current frame includes generating a set of features for each of the current frame and the one or more subsequent frames, applying a machine learning model to each of the sets of features to generate a modeled QP for each of the current frame and the one or more subsequent frames and combining the modeled QPs to determine the estimated QP for the current frame. In some embodiments, a first set of features of the sets of features includes a number of bits generated by a look ahead encode of the current frame, a proportion of syntax bits of the number of bits from the look ahead encode, a proportion of intra coded blocks from the look ahead encode, and a prediction distortion from the look ahead encode.

Processing continues at operation 1202, where a determination is made that the estimated QP is a within a particular sub-range of a number of sub-ranges of an available QP range. Such a determination may be made using any suitable technique or techniques. Processing continues at operation 1203, where a quantization matrix is selected for the current frame from a number of available quantization matrices based on the estimated QP being within the particular sub-range. The quantization matrix may be selected using any suitable technique or techniques and the quantization matrix may be one of several quantization matrices for encode of the current frame. Furthermore, the quantization matrix may have any characteristics discussed herein. In some embodiments, the selected quantization matrix has a first entry corresponding to a DC coefficient and a second entry corresponding to an AC coefficient both having a same value. In some embodiments, the sub-ranges include at least a first sub-range extending from a lowest available QP of the available QP range to a first QP, a second sub-range extending from a second QP, greater than the first QP, to a third QP, greater than the second QP, and a third sub-range extending from a fourth QP, greater than the third QP, to a greatest available QP of the available quantization parameter range. In some embodiments, a first quantization matrix for the first sub-range is a flat matrix, a second quantization matrix for the second sub-range includes a first difference between a first entry corresponding to a DC coefficient and a second entry corresponding to an AC coefficient, and the third quantization matrix for the third sub-range includes a second difference between a third entry corresponding to the DC coefficient and a fourth entry corresponding to the AC coefficient, the second difference being greater than the first difference. In some embodiments, the first difference is zero.

Processing continues at operation 1204, where the current frame is encoded using the selected quantization matrix to generate at least a portion of a bitstream. The current frame may be encoded using any suitable technique or techniques and the bitstream may be any suitable bitstream such as a standards compliant bitstream compliant to the AVC standard, the HEVC standard, the VP9 standard, etc.

In some embodiments, process 1200 further includes determining a frame QP for the current frame was generated based on rate control applied using a second quantization matrix and adjusting the frame QP to a second frame QP based on a QP adjustment corresponding to the selected quantization matrix and the second quantization matrix, such that the current frame is encoded using the adjusted frame QP. In some embodiments, the QP adjustment is negative in response to a first sub-range for the second quantization matrix having lower QPs than the particular sub-range or positive in response to the first sub-range having greater QPs than the particular sub-range.

In some embodiments, process 1200 further includes determining a second estimated QP, greater than or less than the estimated QP, for a second frame of the video sequence temporally prior to the current frame, the second estimated QP corresponding to a second sub-range of the plurality of sub-ranges and a second quantization matrix and encoding the second frame using the selected quantization matrix in response to the estimated QP for the current frame being a quantization matrix switching QP. In some embodiments, the quantization matrix switching QP includes a maximum or minimum QP value in the second sub-range.

In some embodiments, process 1200 further includes defining the sub-ranges of the available QP range, modifying DC and low AC frequency values of the sets of initial quantization matrices to generate a plurality of quantization matrices for testing including the sets of initial quantization matrices and the modified sets of initial quantization matrices, encoding test video sequences using the plurality of quantization matrices for testing, and selecting a final set of quantization matrices for each of the sub-ranges based on perceptual quality scoring of said encodings.

Process 1200 may be repeated any number of times either in series or in parallel for any number of frames. As discussed, process 1200 may provide for video encoding including adaptive quantization matrix selection.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity. In some embodiments, the operations discussed herein are performed by a system including a memory to store any data discussed herein and one or more processors to perform the operations of process 1200 or others discussed herein.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein. In some embodiments, the operations discussed herein are performed by a non-transitory machine readable medium comprising a plurality of instructions that, in response to being executed on a computing device, cause the computing device to perform the operations.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 14:
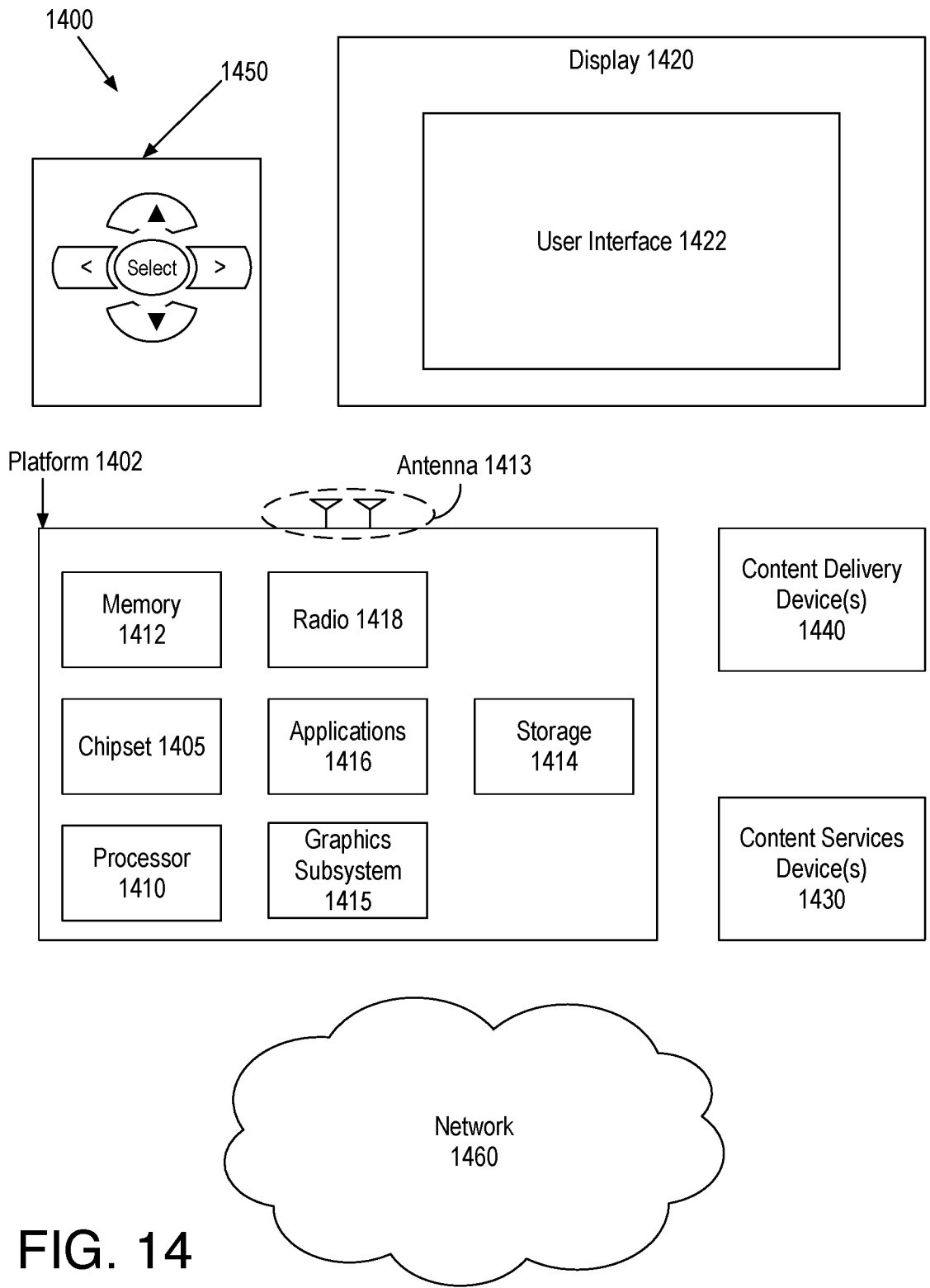
FIG. 14 is an illustrative diagram of an example system.

FIG. 14 is an illustrative diagram of an example system 1400, arranged in accordance with at least some implementations of the present disclosure. In various implementations, system 1400 may be a mobile system although system 1400 is not limited to this context. For example, system 1400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402 and/or display 1420. Each of these components is described in greater detail below.

In various implementations, platform 1402 may include any combination of a chipset 1405, processor 1410, memory 1412, antenna 1413, storage 1414, graphics subsystem 1415, applications 1416 and/or radio 1418. Chipset 1405 may provide intercommunication among processor 1410, memory 1412, storage 1414, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, DisplayPort, wireless HDMI, and/or wireless HD compliant techniques. Graphics subsystem 1415 may be integrated into processor 1410 or chipset 1405. In some implementations, graphics subsystem 1415 may be a stand-alone device communicatively coupled to chipset 1405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of uni-directionally or bi-directionally communicating content between content providers and platform 1402 and/or display 1420, via network 1460 or directly. It will be appreciated that the content may be communicated uni-directionally and/or bi-directionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of may be used to interact with user interface 1422, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1420) by movements of a pointer, cursor, focus ring, or other visual indicators displayed on the display. For example, under the control of software applications 1416, the navigation features located on navigation may be mapped to virtual navigation features displayed on user interface 1422, for example. In various embodiments, may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various embodiments, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various embodiments, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 14.

Figure 15:
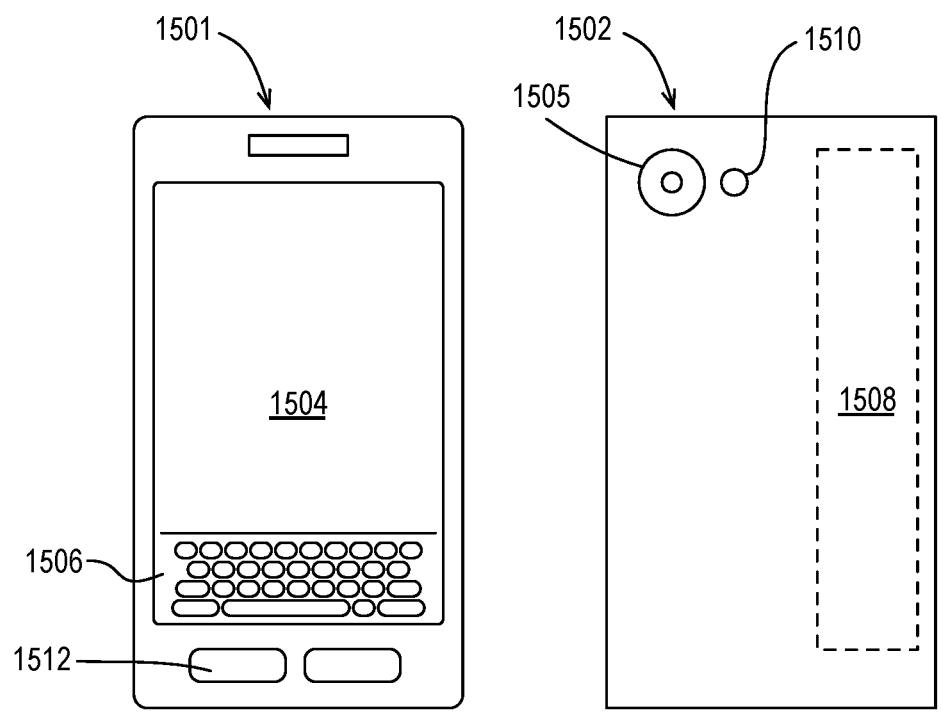
FIG. 15 illustrates an example device, all arranged in accordance with at least some implementations of the present disclosure.

As described above, system 1400 may be embodied in varying physical styles or form factors. FIG. 15 illustrates an example small form factor device 1500, arranged in accordance with at least some implementations of the present disclosure. In some examples, system 1400 may be implemented via device 1500. In other examples, system 100 or portions thereof may be implemented via device 1500. In various embodiments, for example, device 1500 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 15, device 1500 may include a housing with a front 1501 and a back 1502. Device 1500 includes a display 1504, an input/output (I/O) device 1506, and an integrated antenna 1508. Device 1500 also may include navigation features 1512. I/O device 1506 may include any suitable I/O device for entering information into a mobile computing device. Examples for I/O device 1506 may include an alphanumeric keyboard, a numeric keypad, a touch pad, input keys, buttons, switches, microphones, speakers, voice recognition device and software, and so forth. Information also may be entered into device 1500 by way of microphone (not shown), or may be digitized by a voice recognition device. As shown, device 1500 may include a camera 1505 (e.g., including a lens, an aperture, and an imaging sensor) and a flash 1510 integrated into back 1502 (or elsewhere) of device 1500. In other examples, camera 1505 and flash 1510 may be integrated into front 1501 of device 1500 or both front and back cameras may be provided. Camera 1505 and flash 1510 may be components of a camera module to originate image data processed into streaming video that is output to display 1504 and/or communicated remotely from device 1500 via antenna 1508 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a method for video encoding comprises determining an estimated quantization parameter (QP) for a current frame of a video sequence using the current frame and one or more frames subsequent to the current frame, determining the estimated QP is within a particular sub-range of a plurality of sub-ranges of an available QP range, selecting a quantization matrix for the current frame from a plurality of available quantization matrices based on the estimated QP being within the particular sub-range, and encoding the current frame using the selected quantization matrix to generate at least a portion of a bitstream.

In one or more second embodiments, further to the first embodiment, the selected quantization matrix has a first entry corresponding to a DC coefficient and a second entry corresponding to an AC coefficient both having a same value.

In one or more third embodiments, further to the first or second embodiments, the plurality of sub-ranges comprises at least a first sub-range extending from a lowest available QP of the available QP range to a first QP, a second sub-range extending from a second QP, greater than the first QP, to a third QP, greater than the second QP, and a third sub-range extending from a fourth QP, greater than the third QP, to a greatest available QP of the available quantization parameter range.

In one or more fourth embodiments, further to any of the first through third embodiments, a first quantization matrix for the first sub-range is a flat matrix, a second quantization matrix for the second sub-range comprises a first difference between a first entry corresponding to a DC coefficient and a second entry corresponding to an AC coefficient, and the third quantization matrix for the third sub-range comprises a second difference between a third entry corresponding to the DC coefficient and a fourth entry corresponding to the AC coefficient, the second difference being greater than the first difference.

In one or more fifth embodiments, further to any of the first through fourth embodiments, the first difference is zero.

In one or more sixth embodiments, further to any of the first through fifth embodiments, the method further comprises determining a frame QP for the current frame was generated based on rate control applied using a second quantization matrix and adjusting the frame QP to a second frame QP based on a QP adjustment corresponding to the selected quantization matrix and the second quantization matrix, wherein the current frame is encoded using the adjusted frame QP.

In one or more seventh embodiments, further to any of the first through sixth embodiments, the QP adjustment is negative in response to a first sub-range for the second quantization matrix having lower QPs than the particular sub-range or positive in response to the first sub-range having greater QPs than the particular sub-range.

In one or more eighth embodiments, further to any of the first through seventh embodiments, the method further comprises determining a second estimated QP, greater than or less than the estimated QP, for a second frame of the video sequence temporally prior to the current frame, the second estimated QP corresponding to a second sub-range of the plurality of sub-ranges and a second quantization matrix and encoding the second frame using the selected quantization matrix in response to the estimated QP for the current frame being a quantization matrix switching QP.

In one or more ninth embodiments, further to any of the first through eighth embodiments, the quantization matrix switching QP comprises a maximum or minimum QP value in the second sub-range.

In one or more tenth embodiments, further to any of the first through ninth embodiments, determining the estimated quantization parameter for the current frame comprises generating a set of features for each of the current frame and the one or more subsequent frames, applying a machine learning model to each of the sets of features to generate a modeled QP for each of the current frame and the one or more subsequent frames, and combining the modeled QPs to determine the estimated QP for the current frame.

In one or more eleventh embodiments, further to any of the first through tenth embodiments, a first set of features of the sets of features comprises a number of bits generated by a look ahead encode of the current frame, a proportion of syntax bits of the number of bits from the look ahead encode, a proportion of intra coded blocks from the look ahead encode, and a prediction distortion from the look ahead encode.

In one or more twelfth embodiments, further to any of the first through eleventh embodiments, the method further comprises defining the sub-ranges of the available QP range, generating a set of initial quantization matrices for each of the sub-ranges, modifying DC and low AC frequency values of the sets of initial quantization matrices to generate a plurality of quantization matrices for testing comprising the sets of initial quantization matrices and the modified sets of initial quantization matrices, encoding test video sequences using the plurality of quantization matrices for testing, and selecting a final set of quantization matrices for each of the sub-ranges based on perceptual quality scoring of said encodings.

In one or more thirteenth embodiments, a device or system includes a memory and one or more processors to perform a method according to any one of the above embodiments.

In one or more fourteenth embodiments, at least one machine readable medium includes a plurality of instructions that in response to being executed on a computing device, cause the computing device to perform a method according to any one of the above embodiments.

In one or more fifteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system comprising:
a memory to store at least a portion of a current frame of a video sequence; and
one or more processors coupled to the memory, the one or more processors to:
determine an estimated quantization parameter (QP) for the current frame using the current frame and one or more frames subsequent to the current frame;
determine the estimated QP is a within a particular sub-range of a plurality of sub-ranges of an available QP range;
selecting a quantization matrix for the current frame from a plurality of available quantization matrices based on the estimated QP being within the particular sub-range;
encode the current frame using the selected quantization matrix to generate at least a portion of a bitstream;
determine a second estimated QP, greater than or less than the estimated QP, for a second frame of the video sequence temporally prior to the current frame, the second estimated QP corresponding to a second sub-range of the plurality of sub-ranges and a second quantization matrix; and
encode the second frame using the selected quantization matrix in response to the estimated QP for the current frame being a quantization matrix switching QP.

2. The system of claim 1, wherein the selected quantization matrix has a first entry corresponding to a DC coefficient and a second entry corresponding to an AC coefficient both having a same value.

3. The system of claim 1, wherein the plurality of sub-ranges comprises at least a first sub-range extending from a lowest available QP of the available QP range to a first QP, the second sub-range extending from a second QP, greater than the first QP, to a third QP, greater than the second QP, and a third sub-range extending from a fourth QP, greater than the third QP, to a greatest available QP of the available QP range.

4. The system of claim 3, wherein a first quantization matrix for the first sub-range is a flat matrix, a second quantization matrix for the second sub-range comprises a first difference between a first entry corresponding to a DC coefficient and a second entry corresponding to an AC coefficient, and a third quantization matrix for the third sub-range comprises a second difference between a third entry corresponding to the DC coefficient and a fourth entry corresponding to the AC coefficient, the second difference being greater than the first difference.

5. The system of claim 4, wherein the first difference is zero.

6. The system of claim 1, wherein the one or more processors are further to:
determine a frame QP for the current frame was generated based on rate control applied using a further quantization matrix; and
adjust the frame QP to a second frame QP based on a QP adjustment corresponding to the selected quantization matrix and the further quantization matrix, wherein the current frame is encoded using the adjusted frame QP.

7. The system of claim 6, wherein the QP adjustment is negative in response to a first sub-range for the second quantization matrix having lower QPs than the particular sub-range or positive in response to the first sub-range having greater QPs than the particular sub-range.

8. The system of claim 1, wherein the quantization matrix switching QP comprises a maximum QP value in the second sub-range.

9. The system of claim 1, wherein the quantization matrix switching QP comprises a minimum QP value in the second sub-range.

10. The system of claim 1, wherein determining the estimated quantization parameter for the current frame comprises:
generating a set of features for each of the current frame and the one or more frames subsequent to the current frame;
applying a machine learning model to each of the sets of features to generate a modeled QP for each of the current frame and the one or more frames subsequent to the current frame; and
combining the modeled QPs to determine the estimated QP for the current frame.

11. The system of claim 10, wherein a first set of features of the sets of features comprises a number of bits generated by a look ahead encode of the current frame, a proportion of syntax bits of the number of bits from the look ahead encode, a proportion of intra coded blocks from the look ahead encode, and a prediction distortion from the look ahead encode.

12. The system of claim 1, wherein the one or more processors are further to:
define the sub-ranges of the available QP range;
generate a set of initial quantization matrices for each of the sub-ranges;
modify DC and low AC frequency values of the sets of initial quantization matrices to generate a plurality of quantization matrices for testing comprising the sets of initial quantization matrices and the modified sets of initial quantization matrices;
encode test video sequences using the plurality of quantization matrices for testing; and
select a final set of quantization matrices for each of the sub-ranges based on perceptual quality scoring of said encodings.

13. A method comprising:
determining an estimated quantization parameter (QP) for a current frame of a video sequence using the current frame and one or more frames subsequent to the current frame, wherein determining the estimated quantization parameter for the current frame comprises:
generating a set of features for each of the current frame and the one or more frames subsequent to the current frame;
applying a machine learning model to each of the sets of features to generate a modeled QP for each of the current frame and the one or more frames subsequent to the current frame; and
combining the modeled QPs to determine the estimated QP for the current frame;
determining the estimated QP is a within a particular sub-range of a plurality of sub-ranges of an available QP range;
selecting a quantization matrix for the current frame from a plurality of available quantization matrices based on the estimated QP being within the particular sub-range; and
encoding the current frame using the selected quantization matrix to generate at least a portion of a bitstream.

14. The method of claim 13, wherein the selected quantization matrix has a first entry corresponding to a DC coefficient and a second entry corresponding to an AC coefficient both having a same value.

15. The method of claim 13, wherein the plurality of sub-ranges comprises at least a first sub-range extending from a lowest available QP of the available QP range to a first QP, a second sub-range extending from a second QP, greater than the first QP, to a third QP, greater than the second QP, and a third sub-range extending from a fourth QP, greater than the third QP, to a greatest available QP of the available QP range, wherein a first quantization matrix for the first sub-range is a flat matrix, a second quantization matrix for the second sub-range comprises a first difference between a first entry corresponding to a DC coefficient and a second entry corresponding to an AC coefficient, and a third quantization matrix for the third sub-range comprises a second difference between a third entry corresponding to the DC coefficient and a fourth entry corresponding to the AC coefficient, the second difference being greater than the first difference.

16. The method of claim 13, further comprising:
determining a frame QP for the current frame was generated based on rate control applied using a further quantization matrix; and
adjusting the frame QP to a second frame QP based on a QP adjustment corresponding to the selected quantization matrix and the further quantization matrix, wherein the current frame is encoded using the adjusted frame QP.

17. The method of claim 13, further comprising:
determining a second estimated QP, greater than or less than the estimated QP, for a second frame of the video sequence temporally prior to the current frame, the second estimated QP corresponding to a second sub-range of the plurality of sub-ranges and a second quantization matrix; and
encoding the second frame using the selected quantization matrix in response to the estimated QP for the current frame being a quantization matrix switching QP.

18. At least one non-transitory machine readable medium comprising a plurality of instructions that, in response to being executed on a computing device, cause the computing device to perform video coding by:
determining an estimated quantization parameter (QP) for a current frame of a video sequence using the current frame and one or more frames subsequent to the current frame;
determining the estimated QP is a within a particular sub-range of a plurality of sub-ranges of an available QP range;
selecting a quantization matrix for the current frame from a plurality of available quantization matrices based on the estimated QP being within the particular sub-range; and
encoding the current frame using the selected quantization matrix to generate at least a portion of a bitstream;
defining the sub-ranges of the available QP range;
generating a set of initial quantization matrices for each of the sub-ranges;
modifying DC and low AC frequency values of the sets of initial quantization matrices to generate a plurality of quantization matrices for testing comprising the sets of initial quantization matrices and the modified sets of initial quantization matrices;
encoding test video sequences using the plurality of quantization matrices for testing; and
selecting a final set of quantization matrices for each of the sub-ranges based on perceptual quality scoring of said encodings.

19. The at least one non-transitory machine readable medium of claim 18, wherein the plurality of sub-ranges comprises at least a first sub-range extending from a lowest available QP of the available QP range to a first QP, a second sub-range extending from a second QP, greater than the first QP, to a third QP, greater than the second QP, and a third sub-range extending from a fourth QP, greater than the third QP, to a greatest available QP of the available QP range, wherein a first quantization matrix for the first sub-range is a flat matrix, a second quantization matrix for the second sub-range comprises a first difference between a first entry corresponding to a DC coefficient and a second entry corresponding to an AC coefficient, and a third quantization matrix for the third sub-range comprises a second difference between a third entry corresponding to the DC coefficient and a fourth entry corresponding to the AC coefficient, the second difference being greater than the first difference.

20. The at least one non-transitory machine readable medium of claim 18, further comprising instructions that, in response to being executed on the computing device, cause the computing device to perform video coding by:
determining a frame QP for the current frame was generated based on rate control applied using a further quantization matrix; and
adjusting the frame QP to a second frame QP based on a QP adjustment corresponding to the selected quantization matrix and the further quantization matrix, wherein the current frame is encoded using the adjusted frame QP.

21. The at least one non-transitory machine readable medium of claim 18, further comprising instructions that, in response to being executed on the computing device, cause the computing device to perform video coding by:
determining a second estimated QP, greater than or less than the estimated QP, for a second frame of the video sequence temporally prior to the current frame, the second estimated QP corresponding to a second sub-range of the plurality of sub-ranges and a second quantization matrix; and
encoding the second frame using the selected quantization matrix in response to the estimated QP for the current frame being a quantization matrix switching QP.

22. The at least one non-transitory machine readable medium of claim 18, wherein determining the estimated quantization parameter for the current frame comprises:
generating a set of features for each of the current frame and the one or more frames subsequent to the current fram;
applying a machine learning model to each of the sets of features to generate a modeled QP for each of the current frame and the one or more frames subsequent to the current frame; and
combining the modeled QPs to determine the estimated QP for the current frame.

* * * * *

UNITED STATES PATENT AND TRADEMARK OFFICE
CERTIFICATE OF CORRECTION

| | | |
|---|---|---|
| PATENT NO. | : 12,244,807 B2 | Page 1 of 1 |
| APPLICATION NO. | : 18/031563 | |
| DATED | : March 4, 2025 | |
| INVENTOR(S) | : James Holland et al. | |

It is certified that error appears in the above-identified patent and that said Letters Patent is hereby corrected as shown below:

In the Claims

In Column 32, Claim 22, Line 19, delete "fram;" and insert -- frame; --, therefor.

Signed and Sealed this
Twenty-ninth Day of April, 2025

Coke Morgan Stewart
*Acting Director of the United States Patent and Trademark Office*